June 19, 1934.   L. ROSENSTEIN ET AL   1,963,505
PROCESS FOR THE REFINING OF VEGETABLE AND ANIMAL OILS
Filed Sept. 22, 1931
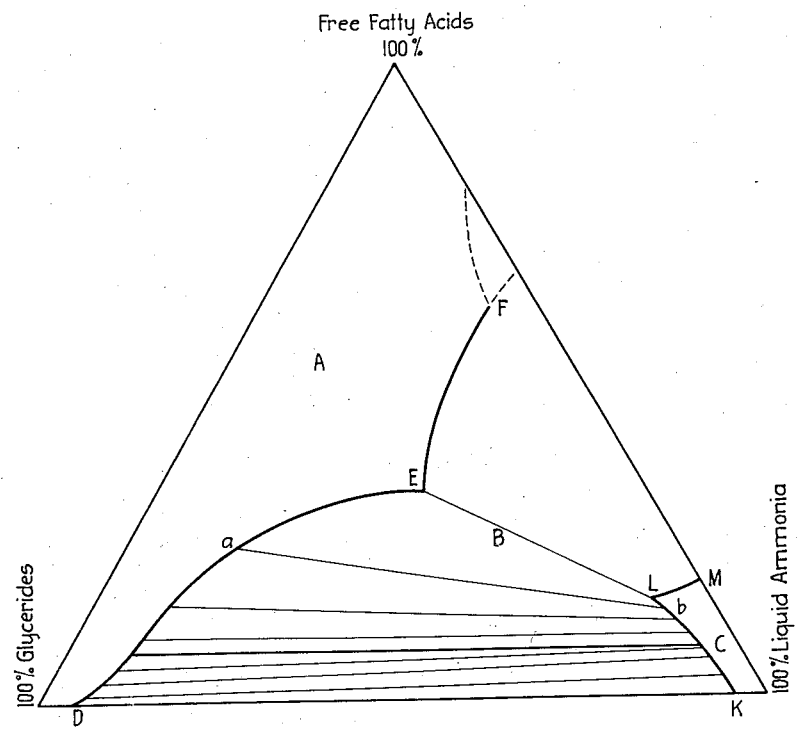
Inventors   L. Rosenstein and W. J. Hund
By Their Attorney Patented June 19, 1934

1,963,505

UNITED STATES PATENT OFFICE 1,963,505

PROCESS FOR THE REFINING OF VEGETABLE AND ANIMAL OILS

Ludwig Rosenstein and Walter J. Hund, San Francisco, Calif.

Application September 22, 1931, Serial No. 564,470

10 Claims. (Cl. 87—12)

This invention relates to a process for the refining of natural organic products such as vegetable and animal oils, fats, waxes and the like. More specifically, it consists of an improved process of refining these natural products wherein they are pretreated in a manner hereinafter described and then refined by extraction with liquid ammonia, as has been set forth in our copending application (Serial No. 413,429), or by some other suitable method.

The refining process as herein disclosed comprises: removing a critical amount of free fatty acids, as well as a portion of coloring, aldehydic and nitrogenous bodies which are normally present in the crude vegetable oils and the like, and completing substantial removal thereof by further refining, such as extraction with liquid ammonia.

It has been found in the course of investigation that when glyceride-free fatty acid systems, of which the vegetable oils, animal oils and fats, are group members, are refined with liquid ammonia the efficiency of extraction of impurities, as measured by the quantity of the refining agent per unit quantity of treated material, is greatly affected by the initial free fatty acid content of the material being treated.

When using liquid ammonia, it has been found that besides formation of soaps, losses in efficiency occur due to the solubility of ammonia in the fatty acid-glyceride mixtures, so that when the two layers, normally formed after contacting liquid ammonia with crude material, are separated, the layer of treated material has been found to contain an excessive amount of the dissolved and/or combined ammonia, due to the unfavorable distribution ratio of this substance in the two phases, while the free fatty acid content in the treated material has not been reduced to the desired low value. The manner in which refining of this material could be completed would be either by repeated treatment with fresh liquid ammonia, or by the use of a larger quantity thereof for the initial contact.

It appears, therefore, that the partial removal of the fatty acids prior to refining by extraction is of decided advantage, as it affords means to obtain the highest possible efficiency from this principal refining operation. The extent of the preliminary removal of the free fatty acids is limited, however, by the difficulty with which it can be accomplished after the free fatty acid content has been substantially reduced.

It has been found in the extraction of free fatty acids with liquid ammonia from glyceride-free fatty acid mixtures, that there is, normally, a definite composition of these mixtures from which further extraction of free fatty acids becomes more effective than from corresponding mixtures possessing a higher free fatty acid content. This limiting composition of the system is characterized by the fact that the fatty acids under equilibrium conditions are soluble in glycerides and liquid ammonia to the same extent, and can be conveniently determined for any oil by a preliminary test.

The accompanying drawing is the typical form of a three component phase-composition diagram for a number of vegetable oils, such as cocoanut, linseed, cotton seed, and the like which were investigated and is included herein to illustrate and amplify the disclosure. While it is not quantitatively accurate for any specific oil, or set of conditions, its general form corresponds closely to the diagrams constructed from actual data collected during treating the natural and synthetic products with liquid ammonia, and is sufficient for the purposes heretofore described.

In this diagram, areas A and C represent various compositions of the system existing as a single phase, while area B includes compositions of the systems which under specified conditions may exist only in two phases, the compositions thereof being indicated by the conjugate points on curves DEF and KLM. Slopes of the straight lines connecting the conjugate points, such as $a$ and $b$ may be interpreted as indicating the efficiency of the extracting process; thus, line $ab$ indicates that while the oil phase contains 24.5% free fatty acids, the liquid ammonia phase in equilibrium with this oil phase contains only 13.9% of the acids. It is observed, however, that when the free fatty acid content of the oil is reduced below a certain point (7.6% in this diagram, but about 3% for cocoanut, linseed, cotton seed and similar vegetable oils) the situation changes, in that the solubility of free fatty acids in the liquid ammonia becomes greater than in the glycerides; at the same time the solubilities of liquid ammonia in glycerides and glycerides in liquid ammonia rapidly decrease. For these reasons the free fatty acid content (such as 7.6% in this diagram) determined in the described manner from actual data may be considered as representing the limiting composition to which an oil should be reduced to afford more efficient extraction with liquid ammonia.

It appears, therefore, that the predetermined free fatty acid content of various oils as obtained from suitable diagrams for the specific materials is the limiting factor as to free fatty acid content during initial extraction from an economic viewpoint, it being realized that the economies of the process can be increased by diminishing this predetermined value to a point intermediate the first figure and a minimum, whereat it no longer becomes economical to reduce free fatty acid content by distillation or similar means prior to extraction.

When alkylolamines are used in the refining process, the removal of a portion of free fatty acids prior to extraction is also of some advantage, as the volume of the soaps formed is materially reduced, requiring a somewhat smaller quantity of the treating reagent.

In the following claims, wherein we specifically set forth and define our invention, the term "vegetable oil and the like" is meant to include various natural products, such as vegetable and animal oils, fats, waxes, etc., generally comprising mixtures of glycerides of the fatty acids, or esters of monohydric alcohols and fatty acids wherein other substances comprising undesirable components, or impurities may or may not be present in substantial amounts.

The free fatty acid content may be reduced by conventional physical methods such as distillation. We have found it useful to resort to vacuum distillation with or without steam. Resort may also be had to the introduction of a current of an inert gas at an elevated temperature which is the equivalent of vacuum distillation.

We claim as our invention:

1. The process of purifying vegetable oils and the like, comprising: reducing the free fatty acid content to a predetermined value by distillation under reduced pressure and extracting residual impurities with a solvent of the class consisting of liquid ammonia and alkylolamines.

2. The process of purifying vegetable oils and the like, comprising: reducing the free fatty acid content to a predetermined value by distillation with an inert gas and extracting residual impurities with a solvent of the class consisting of liquid ammonia and alkylolamines.

3. The process of purifying vegetable oils and the like, comprising: reducing the free fatty acid content by distillation, substantially to a favorable value determined by the distribution ratio of free fatty acids in the two phases of the system, vegetable oil-liquid ammonia, said limiting value corresponding to the distribution ratio of not substantially greater than one, and extracting the residual impurities with liquid ammonia.

4. The process of purifying vegetable oils and the like, comprising: reducing the free fatty acid content to a predetermined value by physical separation and extracting residual impurities with a member of the group: liquid ammonia and alkylolamines.

5. The process of purifying vegetable oils and the like, comprising: reducing the free fatty acid content to a predetermined value by distillation and extracting residual impurities with liquid anhydrous ammonia.

6. The process of purifying vegetable oils and the like, comprising: reducing the free fatty acid content to a predetermined value by distillation and extracting residual impurities with an ethanolamine.

7. The process of purifying vegetable oils and the like, comprising: reducing the free fatty acid content to a predetermined value by distillation and extracting residual impurities, with monoethanolamine.

8. The process of purifying vegetable oils and the like, comprising: reducing the free fatty acid content to a predetermined value by distillation and extracting residual impurities with a member of the group: ammonia and alkylolamines.

9. The process of purifying vegetable oils and the like, comprising: reducing the free fatty acid content to a predetermined value by physical separation and extracting the residual impurities with an alkylolamine.

10. The process of purifying vegetable oils and the like, comprising: reducing the free fatty acid content to a predetermined value by distillation and extracting the residual impurities with a monoalkylolamine.

LUDWIG ROSENSTEIN.
WALTER J. HUND.